(12) United States Patent
Kubo et al.

(10) Patent No.: US 12,515,238 B2
(45) Date of Patent: Jan. 6, 2026

(54) METHOD FOR FORMING MULTILAYER COATING FILM

(71) Applicants: KANSAI PAINT CO., LTD., Hyogo (JP); TOYOTA JIDOSHA KABUSHIKI KAISHA, Aichi-ken (JP)

(72) Inventors: Kentaro Kubo, Aichi (JP); Masahiro Omura, Aichi (JP); Takao Tsukimori, Aichi-ken (JP)

(73) Assignees: KANSAI PAINT CO., LTD., Hyogo (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/918,618

(22) Filed: Oct. 17, 2024

(65) Prior Publication Data

US 2025/0128287 A1    Apr. 24, 2025

(30) Foreign Application Priority Data

Oct. 19, 2023   (JP) ................. 2023-180591

(51) Int. Cl.
| | |
|---|---|
| B05D 3/00 | (2006.01) |
| B05D 1/02 | (2006.01) |
| B05D 3/02 | (2006.01) |
| C09D 5/00 | (2006.01) |
| C09D 5/36 | (2006.01) |
| C09D 7/43 | (2018.01) |
| C09D 7/61 | (2018.01) |
| C09D 7/65 | (2018.01) |
| C09D 133/04 | (2006.01) |

(52) U.S. Cl.
CPC ............. B05D 3/002 (2013.01); B05D 1/02 (2013.01); B05D 3/0218 (2013.01); C09D 5/002 (2013.01); C09D 5/36 (2013.01); C09D 7/43 (2018.01); C09D 7/61 (2018.01); C09D 7/65 (2018.01); C09D 133/04 (2013.01)

(58) Field of Classification Search
CPC ........ B05D 1/02; B05D 3/002; B05D 3/0218; B05D 5/067; B05D 5/068; B05D 7/02; B05D 7/572; B05D 7/574; B05D 2502/00; B05D 2601/08; C09D 5/002; C09D 5/36; C09D 7/43; C09D 7/61; C09D 7/65; C09D 133/04; C09D 143/02; C08K 2003/3045; C08F 220/1804; C08F 265/04

See application file for complete search history.

(56) References Cited

U.S. PATENT DOCUMENTS

| | | | | |
|---|---|---|---|---|
| 8,076,413 | B2* | 12/2011 | Narita ............. | C09D 143/02 428/458 |
| 8,758,896 | B2* | 6/2014 | Imanaka ............ | C08G 18/6659 428/411.1 |
| 9,017,768 | B2* | 4/2015 | Tomizaki ........... | B05D 7/542 427/407.1 |
| 11,213,854 | B2* | 1/2022 | Ono ................. | C09D 133/066 |
| 2009/0075100 | A1 | 3/2009 | Kitamura | |
| 2014/0004365 | A1* | 1/2014 | Kitazono ........... | B05D 7/572 428/483 |
| 2015/0275025 | A1* | 10/2015 | Fujii ............... | C08F 226/10 524/521 |
| 2021/0276042 | A1 | 9/2021 | Itoh et al. | |
| 2022/0403204 | A1* | 12/2022 | Sakai .............. | B05D 3/0254 |

FOREIGN PATENT DOCUMENTS

| | | |
|---|---|---|
| JP | 2008-237939 | 10/2008 |
| WO | 2018/092874 | 5/2018 |

\* cited by examiner

*Primary Examiner* — William P Fletcher, III

(74) *Attorney, Agent, or Firm* — Wenderoth, Lind & Ponack, L.L.P.

(57) ABSTRACT

An object of the present invention is to provide a method for forming a multilayer coating film, the method being capable of providing a multilayer coating film with excellent finished appearance and luster. The aqueous base paint (X) comprises: a hydroxy-containing acrylic resin particle (X1) having a core-shell structure wherein the shell has an acid value of 90 to 100 mg KOH/g; and a hydroxy-containing acrylic resin particle (X2) having a core-shell structure wherein the shell has an acid value of 110 to 120 mg KOH/g; and an associative thickener (X3), wherein the proportions of the hydroxy-containing acrylic resin particle (X1) and the hydroxy-containing acrylic resin particle (X2) contained in the aqueous base paint (X) are such that the ratio by mass of the hydroxy-containing acrylic resin particle (X1) to the hydroxy-containing acrylic resin particle (X2) (X1/X2) is in the range of 70/30 to 30/70. The effect pigment dispersion (Y) contains a flake-aluminum pigment (Y1), a cellulose-based rheology control agent (Y2), a surface-adjusting agent (Y3), and water, and has a solids content within the range of 2 to 6 mass %. The effect coating film formed using the effect pigment dispersion (Y) has a cured film thickness of 0.5 to 1.5 μm.

1 Claim, No Drawings

METHOD FOR FORMING MULTILAYER COATING FILM

TECHNICAL FIELD

The present invention relates to a method for forming a multilayer coating film.

BACKGROUND ART

In general, coating films formed by applying paint to various substrates are required to not only protect the substrates, but also impart design (beauty) to their appearance. In particular, topcoat paint applied to the exterior panels and bumpers of automobiles is required to be capable of forming a topcoat film with excellent texture and sophisticated design.

For example, a multilayer coating film with a metallic coating color, which has recently been commonly used for a top coating film to achieve a high-quality design, is formed by using, as a topcoat paint, an effect base paint that contains an effect pigment for imparting excellent luster and a transparent clear paint. A high-grade effect coating film has excellent luster, and in the coating film, the effect pigment is relatively uniformly present, showing almost no metallic mottling.

The effect pigment for use is typically an aluminum flake pigment with metallic luster. Multilayer coating films with a metallic coating color are typically formed by sequentially applying a base paint, an effect base paint containing an effect pigment, and a clear paint on a substrate using a wet-on-wet process, followed by curing the resulting uncured coating films with a single baking treatment.

For example, Patent Literature (PTL) 1 discloses a method of forming a coating film with metallic luster, the method comprising sequentially applying a first base metallic paint comprising an aluminum pigment (A) having an average particle diameter D50 of 13 to 40 μm and an average thickness of 0.4 to 2.5 μm, and an aluminum pigment (B) having an average particle diameter D50 of 4 to 30 μm and an average thickness of 0.02 to less than 0.4 μm, wherein the mass ratio on a solids content basis of the aluminum pigments (A) and (B) (A/B) is 90/10 to 10/90, and the total mass on a solids content basis of the aluminum pigments (A) and (B) (A+B) is 5 to 50 parts by mass per 100 parts by mass of the resin solids content, a second base effect paint comprising a very small flake pigment, or a very small flake pigment and an aluminum pigment (C), and a clear paint, followed by baking to cure the resulting coating films. Based on this method, PTL 1 discloses providing a method of forming a coating film that has excellent undercoat hiding power and excellent brilliance with both pearly and metallic luster, as well as three-dimensional brilliance.

However, in the method disclosed in PTL 1, the coating film formed from the second base effect paint has a relatively large film thickness, and the metallic luster is insufficient.

Patent Literature (PTL) 2 discloses a method for forming a multilayer coating film comprising the following steps (1) to (5):

(1) applying a colored paint (W) to a substrate and heating to form a colored coating film;
(2) applying a base paint (X) to the colored coating film formed in step (1) to form a base coating film;
(3) applying an effect pigment dispersion (Y) to the base coating film formed in step (2) to form an effect coating film;
(4) applying a clear paint (Z) onto the effect coating film formed in step (3) to form a clear coating film; and
(5) heating the uncured base coating film, the uncured effect coating film, and the uncured clear coating film formed in steps (2) to (4) to simultaneously cure these three coating films, wherein the effect pigment dispersion (Y) contains water, a surface-adjusting agent (A), a flake effect pigment (B), and a rheology control agent (C), and has a solids content of 0.5 to 10 mass %. PTL 2 discloses that this method can produce a multilayer coating film that exhibits excellent metallic luster.

In the method of PTL 2, excellent metallic luster can be obtained. However, since the effect pigment dispersion (Y) has a low solids content, sagging may occur.

In the fields of, in particular, automotive coating etc., the surface finish of the formed coating film has a significant impact on the marketability of the product. It is thus necessary to develop a coating film-forming method that is capable of forming a multilayer coating film with excellent surface finish and high-quality design.

Further, bumpers, which are made of molded plastics, unlike exterior panels, require baking at a relatively low temperature to cure the coating film.

CITATION LIST

Patent Literature

PTL 1: JP2008-237939A
PTL 2: WO2018/092874

SUMMARY OF INVENTION

Technical Problem

An object of the present invention is to provide a method for forming a multilayer coating film, the method being capable of providing a multilayer coating film with excellent finished appearance and excellent luster on a plastic molded article.

Solution to Problem

The present invention encompasses the subject matter described in the following items.
Item 1.
A method for forming a multilayer coating film comprising the following steps in sequence:
step (1): applying an aqueous primer paint (W) to a plastic molded article to form an uncured primer coating film;
step (2): preheating the uncured primer coating film;
step (3): applying an aqueous base paint (X) to the preheated primer coating film to form an uncured base coating film;
step (4): applying an effect pigment dispersion (Y) to the uncured base coating film to form an uncured effect coating film;
step (5): preheating the uncured base coating film and the uncured effect coating film;
step (6): applying a clear paint (Z) to the preheated effect coating film to form an uncured clear coating film; and
step (7): heating the preheated primer coating film, the preheated base coating film, the preheated effect coating film, and the uncured clear coating film at a temperature in the range of 110 to 130° C. to simultaneously cure the coating films, wherein the aqueous base paint (X) comprises
  a hydroxy-containing acrylic resin particle (X1) having a core-shell structure wherein the shell has an acid value of 90 to 100 mg KOH/g;
  a hydroxy-containing acrylic resin particle (X2) having a core-shell structure wherein the shell has an acid value of 110 to 120 mg KOH/g; and
  an associative thickener (X3);
the ratio by mass of the hydroxy-containing acrylic resin particle (X1) to the hydroxy-containing acrylic resin particle (X2) contained in the aqueous base paint (X1/X2) is in the range of 70/30 to 30/70;
the effect pigment dispersion (Y) contains
  a flake-aluminum pigment (Y1),
  a cellulose-based rheology control agent (Y2),
  a surface-adjusting agent (Y3), and
  water, and
the effect pigment dispersion (Y) has a solids content in the range of 2 to 6 mass %; and
the effect coating film after curing has a film thickness of 0.5 to 1.5 μm.

Advantageous Effects of Invention

The present invention is capable of providing a method for forming a multilayer coating film with excellent finished appearance and excellent luster on a plastic molded article.

DESCRIPTION OF EMBODIMENTS

The method for forming a multilayer coating film of the present invention comprises the following steps in sequence:
  step (1): applying an aqueous primer paint (W) to a plastic molded article to form an uncured primer coating film;
  step (2): preheating the uncured primer coating film;
  step (3): applying an aqueous base paint (X) to the preheated primer coating film to form an uncured base coating film;
  step (4): applying an effect pigment dispersion (Y) to the uncured base coating film to form an uncured effect coating film;
  step (5): preheating the uncured base coating film and the uncured effect coating film;
  step (6): applying a clear paint (Z) to the preheated effect coating film to form an uncured clear coating film; and
  step (7): heating the preheated primer coating film, the preheated base coating film, the preheated effect coating film, and the uncured clear coating film at a temperature in the range of 110 to 130° C. to simultaneously cure the coating films, wherein the aqueous base paint (X) comprises
  a hydroxy-containing acrylic resin particle (X1) having a core-shell structure wherein the shell has an acid value of 90 to 100 mg KOH/g;
  a hydroxy-containing acrylic resin particle (X2) having a core-shell structure wherein the shell has an acid value of 110 to 120 mg KOH/g; and
  an associative thickener (X3),
wherein the mass ratio of the hydroxy-containing acrylic resin particle (X1) and the hydroxy-containing acrylic resin particle (X2) contained in the paint (X1/X2) is in the range of 70/30 to 30/70,
wherein the effect pigment dispersion (Y) contains a flake-aluminum pigment (Y1), a cellulose-based rheology control agent (Y2), a surface-adjusting agent (Y3), and water, and has a solids content in the range of 2 to 6 mass %, and wherein the effect coating film after curing has a film thickness of 0.5 to 1.5 μm.

Step (1)

The step (1) of the present invention is a step of applying an aqueous primer paint (W) to a plastic molded article to form an uncured primer coating film.

Plastic Molded Article

Particularly preferable examples of the material for the plastic molded article include, but are not limited to, polyolefins obtained by polymerizing at least one $C_2$-$C_{10}$ olefin, such as ethylene, propylene, butylene, and hexene. Other examples include polycarbonates, ABS resins, urethane resins, and nylons.

The plastic molded article can be obtained, for example, by molding a material such as those mentioned above by injection molding or like known method. The plastic molded article can be suitably subjected to degreasing, water washing, or like treatment beforehand by a known method.

Aqueous Primer Paint (W)

In the present specification, the "aqueous primer paint (W)" is an aqueous paint used to impart high adhesiveness to a paint formed on a plastic molded article.

The aqueous primer paint (W) for use in this step is preferably an aqueous paint that is commonly used in this field, and that contains a base resin, a curing agent, an organic solvent, and water.

The base resin and the curing agent may be known compounds commonly used in this field. Examples of the base resin include acrylic resins, polyester resins, polyurethane resins, and olefin resins. Examples of the curing agent include amino resins, polyisocyanate compounds, and blocked polyisocyanate compounds.

Examples of the organic solvent include hydrocarbons, such as aliphatic hydrocarbons (e.g., hexane and heptane), aromatic hydrocarbons (e.g., xylene and toluene), and alicyclic hydrocarbons; esters, such as ethyl acetate and butyl acetate; ethers, such as ethylene glycol monomethyl ether; alcohols, such as ethanol, propanol, and 2-ethylhexyl alcohol; ketones, such as methyl ethyl ketone and methyl isobutyl ketone; amides; and other solvents. Examples of organic solvents containing aromatic hydrocarbons include Swasol 310 and Swasol 1000 (produced by Cosmo Oil Co., Ltd.).

The aqueous primer paint (W) used in the method of the present invention may contain, in addition to the above components, an ultraviolet absorber, an antifoaming agent, a thickener, an anti-rust agent, a surface-adjusting agent, a pigment, etc., as desired.

The aqueous primer paint (W) can be applied by using usual coating methods commonly used in this field. Examples of the coating method include coating methods using a brush or a coater. Among these, a coating method using a coater is preferable. For example, the coater is preferably an airless spray coater, an air spray coater, or a rotary-atomization coater, such as a paint cassette coater, and particularly preferably a rotary-atomization coater. The use of the above paint and coating method can form an uncured primer coating film with excellent coating appearance.

The primer coating film preferably has a film thickness of 5 to 20 μm, and particularly preferably 7 to 15 μm, on a cured primer coating film basis.

Step (2)

The step (2) of the present invention is a step of preheating the uncured primer coating film.

In the present specification, "preheating" means treatment in which an object to be coated, with a coating film formed on its surface, is heated for a time and under temperature conditions such that the base resin and curing agent in the coating film do not react or cure, or substantially do not react or cure, thus volatilizing the aqueous medium and/or other volatile substances in the coating film.

The preheating temperature is preferably within the range of 40 to 80° C., and more preferably 50 to 70° C. The preheating time is preferably 1 to 5 minutes.

Step (3)

Step (3) of the present invention is a step of applying an aqueous base paint (X) to the preheated primer coating film to form an uncured base coating film.

Aqueous Base Paint (X)

In the present specification, the "aqueous base paint (X)" refers to an aqueous paint used to improve finished appearance by hiding the underlying primer.

The aqueous base paint (X) comprises a hydroxy-containing acrylic resin particle (X1) having a core-shell structure wherein the shell has an acid value of 90 to 100 mg KOH/g; and a hydroxy-containing acrylic resin particle (X2) having a core-shell structure wherein the shell has an acid value of 110 to 120 mg KOH/g; and an associative thickener (X3), wherein the mass ratio of the hydroxy-containing acrylic resin particle (X1) and the hydroxy-containing acrylic resin particle (X2) contained in the aqueous base paint (X1/X2) is in the range of 70/30 to 30/70.

In view of the finished appearance of the obtained coating film, the mass ratio of the hydroxy-containing acrylic resin particle (X1) to the hydroxy-containing acrylic resin particle (X2) (X1/X2) is preferably in the range of 65/35 to 35/65, and more preferably in the range of 60/40 to 40/60.

In the present invention, the "shell portion" of the "hydroxy-containing acrylic resin particle having a core-shell structure" refers to a polymer layer present as the outermost layer of resin particle, the "core portion" refers to a polymer layer inside the resin particle other than the shell portion, and the "core-shell structure" means a structure having the core portion and the shell portion. The core-shell structure generally refers to a layer structure in which the core portion is completely covered with the shell portion. However, depending on, for example, the mass ratio of the core portion and the shell portion, the amount of monomer in the shell portion may be insufficient to form such a layer structure. In such a case, it is not necessary that the core-shell structure be a complete layer structure as described above. The core-shell structure can be a structure in which a part of the core is covered with the shell.

The hydroxy-containing acrylic resin particle (X1) having a core-shell structure wherein the shell has an acid value of 90 to 100 mg KOH/g is an acrylic resin particle comprising a core portion and a shell portion, the core portion being a copolymer (I) comprising a polymerizable unsaturated monomer as a copolymer component, and the shell portion being a copolymer (II) comprising a polymerizable unsaturated monomer as a copolymer component. The acid value of the shell portion can be calculated from the monomer composition.

The polymerizable unsaturated monomers for use can be a suitable combination of a hydroxy-containing polymerizable unsaturated monomer, an acid group-containing polymerizable unsaturated monomer, and another polymerizable unsaturated monomer that is copolymerizable with the hydroxy-containing polymerizable unsaturated monomer and the acid group-containing polymerizable unsaturated monomer.

The hydroxy-containing polymerizable unsaturated monomer is a compound containing one or more hydroxy groups and one or more polymerizable unsaturated bonds per molecule. Examples of the hydroxy-containing polymerizable unsaturated monomer include monoesterified products of (meth)acrylic acid with a dihydric alcohol having 2 to 8 carbon atoms (e.g., 2-hydroxyethyl(meth)acrylate, 2-hydroxypropyl(meth)acrylate, 3-hydroxypropyl(meth)acrylate, and 4-hydroxybutyl(meth)acrylate); ε-caprolactone-modified products of such monoesterified products of (meth)acrylic acid with a dihydric alcohol having 2 to 8 carbon atoms; N-hydroxymethyl(meth) acrylamide; allyl alcohol; and (meth)acrylates having a hydroxy-terminated polyoxyethylene chain, provided, however, that in the present invention, monomers corresponding to (xiv) polymerizable unsaturated monomers having a UV-absorbing functional group, described later, are excluded from the above hydroxy-containing polymerizable unsaturated monomers and should be included in other polymerizable unsaturated monomers that are copolymerizable with the hydroxy-containing polymerizable unsaturated monomers. Such monomers can be used alone or in a combination of two or more.

The acid group-containing polymerizable unsaturated monomer refers to a compound having one or more acid groups and one or more polymerizable unsaturated bonds per molecule. Examples of the acid group include a carboxylate group, a phosphate group, and a sulfate group, with the carboxylate group being preferred.

Examples of the compound having one or more carboxylate groups and one or more polymerizable unsaturated bonds include acrylic acid, methacrylic acid, crotonic acid, itaconic acid, maleic acid, and maleic anhydride.

Examples of the compound having one or more phosphate groups and one or more polymerizable unsaturated bonds include acid phosphooxyethyl(meth)acrylate, acid phosphooxypropyl(meth)acrylate, acid phosphooxypoly(oxyethylene) glycol(meth)acrylate, and acid phosphooxypoly(oxypropylene) glycol (meth)acrylate.

Examples of the compound having one or more sulfate groups and one or more polymerizable unsaturated bonds include 2-acrylamido-2-methylpropanesulfonic acid, 2-sulfoethyl(meth)acrylate, allylsulfonic acid, 4-styrenesulfonic acid, and the like; and sodium salts and ammonium salts of these sulfonic acids.

Examples of other polymerizable unsaturated monomers that are copolymerizable with the hydroxy-containing polymerizable unsaturated monomer and the acid group-containing polymerizable unsaturated monomer include the following monomers (i) to (xvii). Such other polymerizable unsaturated monomers can be used alone or in a combination of two or more.

(i) Alkyl or cycloalkyl(meth)acrylates: examples include methyl(meth)acrylate, ethyl(meth)acrylate, n-propyl(meth)acrylate, isopropyl(meth)acrylate, n-butyl(meth)acrylate, isobutyl(meth)acrylate, tert-butyl(meth)acrylate, n-hexyl(meth)acrylate, n-octyl(meth)acrylate, 2-ethylhexyl(meth)acrylate, nonyl(meth)acrylate, tridecyl(meth)acrylate, lauryl(meth)acrylate, stearyl(meth)acrylate, isostearyl(meth)acrylate, cyclohexyl(meth)acrylate, methylcyclohexyl(meth)acrylate, t-butyl cyclohexyl(meth)acrylate, cyclododecyl(meth)acrylate, and tricyclodecanyl(meth)acrylate.

(ii) Isobornyl-containing polymerizable unsaturated monomers: examples include isobornyl(meth)acrylate.

(iii) Adamantyl-containing polymerizable unsaturated monomers: examples include adamantyl(meth)acrylate.

(iv) Tricyclodecenyl-containing polymerizable unsaturated monomers: examples include tricyclodecenyl (meth)acrylate.
(v) Aromatic ring-containing polymerizable unsaturated monomers: examples include benzyl(meth)acrylate, styrene, α-methylstyrene, and vinyl toluene.
(vi) Alkoxysilyl-containing polymerizable unsaturated monomers: examples include vinyltrimethoxysilane, vinyltriethoxysilane, vinyl tris(2-methoxyethoxy) silane, γ-(meth) acryloyloxypropyltrimethoxysilane, and γ-(meth) acryloyloxypropyltriethoxysilane.
(vii) Polymerizable unsaturated monomers having a fluorinated alkyl group: examples include perfluoroalkyl (meth)acrylates, such as perfluorobutylethyl(meth) acrylate and perfluorooctylethyl(meth)acrylate, and fluoroolefin.
(viii) Polymerizable unsaturated monomers having photopolymerizable functional groups: examples include maleimide.
(ix) Vinyl compounds: examples include N-vinylpyrrolidone, ethylene, butadiene, chloroprene, vinyl propionate, and vinyl acetate.
(x) Nitrogen-containing polymerizable unsaturated monomers: examples include (meth) acrylonitrile, (meth) acrylamide, N, N-dimethylaminoethyl(meth) acrylate, N, N-diethylaminoethyl(meth)acrylate, N, N-dimethylaminopropyl(meth) acrylamide, methylene bis(meth) acrylamide, ethylene bis(meth) acrylamide, and adducts of glycidyl(meth)acrylate and amine compounds.
(xi) Polymerizable unsaturated monomers having two or more polymerizable unsaturated groups per molecule: examples include allyl(meth)acrylate, ethylene glycol di(meth)acrylate, 1,4-butanediol di(meth)acrylate, neopentyl glycol di(meth)acrylate, and 1,6-hexanediol di(meth)acrylate.
(xii) Epoxy-containing polymerizable unsaturated monomers: examples include glycidyl(meth)acrylate, β-methylglycidyl(meth)acrylate, 3,4-epoxycyclohexylmethyl(meth)acrylate, 3,4-epoxycyclohexylethyl (meth)acrylate, 3,4-epoxycyclohexylpropyl(meth) acrylate, and allyl glycidyl ether.
(xiii)(Meth)acrylates having an alkoxy-terminated polyoxyethylene chain.
(xiv) Polymerizable unsaturated monomers having an ultraviolet-absorbing functional group: examples include 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy) benzophenone, 2,2'-dihydroxy-4-(3-acryloyloxy-2-hydroxypropoxy)benzophenone, and 2-[2-hydroxy-5-[2-(methacryloyloxy)ethyl]phenyl]-2H-benzotriazole.
(xv) Light-stable polymerizable unsaturated monomers: examples include 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, and 1-crotonoyl-4-crotonoyloxy-2,2,6, 6-tetramethylpiperidine.
(xvi) Polymerizable unsaturated monomers having a carbonyl group: examples include acrolein, diacetone acrylamide, diacetone methacrylamide, acetoacetoxy-ethyl methacrylate, formyl styrene, and vinyl alkyl ketones having 4 to 7 carbon atoms (for example, vinyl methyl ketone, vinyl ethyl ketone, and vinyl butyl ketone).
(xvii) Polymerizable unsaturated monomers having an acid anhydride group: examples include maleic anhydride, itaconic anhydride, and citraconic anhydride.

In the present specification, the polymerizable unsaturated group means an unsaturated group that is radically polymerizable. Examples of such polymerizable unsaturated groups include vinyl and (meth) acryloyl.

In the present specification, the term "(meth)acrylate" means acrylate or methacrylate. The term "(meth)acrylic acid" means acrylic acid or methacrylic acid. The term "(meth)acryloyl" means acryloyl or methacryloyl. The term "(meth)acrylamide" means acrylamide or methacrylamide.

In a typical embodiment, in order to produce the hydroxy-containing acrylic resin particle (X1) having a core-shell structure in which the shell has an acid value of 90 to 100 mg KOH/g, an emulsion for the core copolymer (I) is first prepared by emulsion polymerization of a polymerizable unsaturated monomer mixture.

The emulsion polymerization for preparing an emulsion for the core copolymer (I) can be carried out according to a known method. For example, the emulsion can be prepared by subjecting the monomer mixture to emulsion polymerization using a polymerization initiator in the presence of an emulsifier.

Examples of emulsifiers that can be preferably used include anionic surfactants and nonionic surfactants.

Examples of anionic emulsifiers include sodium salts and ammonium salts of alkylsulfonic acids, alkylbenzenesulfonic acids, and alkylphosphoric acids. Examples of nonionic emulsifiers include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, and polyoxyethylene sorbitan monolaurate.

Other examples of usable anionic emulsifiers include polyoxyalkylene group-containing anionic emulsifiers having an anionic group and a polyoxyalkylene group, such as a polyoxyethylene group or a polyoxypropylene group, per molecule; and reactive anionic emulsifiers having an anionic group and a radically polymerizable unsaturated group per molecule.

Examples of reactive anionic surfactants include sodium salts of sulfonic acid compounds having a radically polymerizable unsaturated group, such as allyl, methallyl, (meth) acryloyl, propenyl, or butenyl; and ammonium salts of such sulfonic acid compounds.

The emulsifier is preferably used in an amount of about 0.1 to 15 mass %, more preferably about 0.5 to 10 mass %, and even more preferably about 1 to 5 mass %, based on the total amount of the monomers used in preparing the core copolymer.

Examples of the polymerization initiator include organic peroxides such as benzoyl peroxide, octanoyl peroxide, lauroyl peroxide, stearoyl peroxide, cumene hydroperoxide, tert-butyl peroxide, tert-butyl peroxylaurate, tert-butyl peroxyisopropyl carbonate, tert-butyl peroxyacetate, and diisopropylbenzene hydroperoxide; azo compounds such as azobisisobutyronitrile, azobis(2,4-dimethylvaleronitrile), azobis(2-methylpropiononitrile), azobis(2-methylbutyronitrile), 4,4'-azobis(4-cyanobutanoic acid), dimethylazobis(2- methylpropionate), azobis[2-methyl-N-(2-hydroxyethyl)-propionamide], and azobis {2-methyl-N-[2-(1-hydroxybutyl)]-propionamide}; and persulfates such as potassium persulfate, ammonium persulfate, and sodium persulfate. Such polymerization initiators can be used singly or in a combination of two or more. Redox initiators prepared by combining a polymerization initiator such as those mentioned above with a reducing agent, such as sugar, sodium formaldehyde sulfoxylate, or iron complex, can also be used.

In general, the polymerization initiator is preferably used in an amount of about 0.1 to 5 mass %, and particularly preferably about 0.2 to 3 mass %, based on the total amount of the monomers used in preparing the core copolymer. The method for adding the polymerization initiator is not particularly limited, and can be appropriately selected according to, for example, the type and amount of the polymerization initiator used. For example, the polymerization initiator can be incorporated into a monomer mixture or an aqueous medium beforehand, or can be added all at once or dropwise at the time of polymerization.

By using a polymerizable unsaturated monomer having two or more polymerizable unsaturated groups per molecule as the polymerizable unsaturated monomer, a copolymer crosslinked structure can be imparted. When a polymerizable unsaturated monomer having two or more polymerizable unsaturated groups per molecule is used, the proportion in which the polymerizable unsaturated monomer is used can be appropriately determined according to the degree of crosslinking of the copolymer. In general, the proportion is preferably in the range of about 0.1 to 30 mass %, particularly preferably about 0.5 to 10 mass %, and more particularly preferably about 1 to 7 mass %, based on the total amount of the polymerizable unsaturated monomers used in preparing the core copolymer.

The hydroxy-containing acrylic resin particle (X1) having a core-shell structure wherein the shell has an acid value of 90 to 100 mg KOH/g can be obtained by further forming a shell copolymer (II).

If necessary, the monomer mixture for forming the shell copolymer (II) can appropriately contain a polymerization initiator such as those mentioned above, a chain transfer agent, a reducing agent, an emulsifier, and other components. The monomer mixture can be added dropwise as is, but is preferably dispersed in an aqueous medium and then added dropwise as a monomer emulsion. The particle size of the monomer emulsion in this case is not particularly limited.

The method for polymerizing the monomer mixture to form the shell copolymer (II) can be performed, for example, by adding the monomer mixture or an emulsion thereof all at once or dropwise and heating the mixture to an appropriate temperature while stirring.

In view of finished appearance of the resulting coating film, the hydroxy-containing acrylic resin particle (X1) having a core-shell structure wherein the shell has an acid value of 90 to 100 mg KOH/g, preferably has a hydroxy value in the range of 1 to 50 mg KOH/g, more preferably 2 to 30 mg KOH/g, and even more preferably 3 to 20 mg KOH/g.

In view of water resistance of the resulting coating film etc., the core portion of the hydroxy-containing acrylic resin particle (X1) having a core-shell structure wherein the shell has an acid value of 90 to 100 mg KOH/g, preferably has a hydroxy value of 20 mg KOH/g or less, more preferably 15 mg KOH/g or less, and even more preferably 10 mg KOH/g or less.

In view of water resistance of the resulting coating film etc., the shell portion of the hydroxy-containing acrylic resin particle (X1) having a core-shell structure wherein the shell has an acid value of 90 to 100 mg KOH/g, preferably has a hydroxy value of 20 to 80 mg KOH/g, more preferably 25 to 70 mg KOH/g, and even more preferably 30 to 60 mg KOH/g.

In view of storage stability of the paint, water resistance of the resulting coating film, etc., the hydroxy-containing acrylic resin particle (X1) having a core-shell structure wherein the shell has an acid value of 90 to 100 mg KOH/g, preferably has an acid value of 5 to 50 mg KOH/g, more preferably 10 to 40 mg KOH/g, and even more preferably 15 to 30 mg KOH/g.

In view of production stability, storage stability of the paint, etc., the core portion of the hydroxy-containing acrylic resin particle (X1) having a core-shell structure wherein the shell has an acid value of 90 to 100 mg KOH/g, preferably has an acid value of 20 mg KOH/g or less, more preferably 15 mg KOH/g or less, and even more preferably 10 mg KOH/g or less.

In view of water resistance of the resulting coating film, the hydroxy-containing acrylic resin particle (X1) having a core-shell structure with a shell acid value of 90 to 100 mg KOH/g, preferably has a glass transition temperature of 20° C. or more, more preferably 30° C. or more, and even more preferably within the range of 30 to 60° C.

The core portion of the hydroxy-containing acrylic resin particle (X1) having a core-shell structure wherein the shell has an acid value of 90 to 100 mg KOH/g, preferably has a glass transition temperature of 20° C. or higher, more preferably 30° C. or higher, and even more preferably within the range of 30 to 60° C.

In view of coating film formability etc., the hydroxy-containing acrylic resin particle (X1) having a core-shell structure wherein the shell has an acid value of 90 to 100 mg KOH/g, preferably comprises a shell portion having a glass transition temperature of 0° C. or higher, more preferably 5° C. or higher, and even more preferably within the range of 5 to 30° C.

In the present specification, the glass transition temperature Tg refers to a value calculated according to the following formula:

$$1/Tg(K) = W1/T1 + W2/T2 + \ldots Wn/Tn$$

$$Tg(° C.) = Tg(K) - 273$$

wherein W1, W2 . . . . Wn are mass fractions of the individual monomers; and T1, T2 . . . . Tn are glass transition temperatures Tg (K) of homopolymers of the individual monomers. The glass transition temperatures of homopolymers of the individual monomers are values shown in the Polymer Handbook, Fourth Edition, edited by J. Brandrup, E. H. Immergut, and E. A. Grulke, 1999. When the glass transition temperature of a monomer is not shown in the Handbook, a homopolymer of the monomer having a weight average molecular weight of around 50000 is synthesized, and the glass transition temperature of the homopolymer as determined by differential scanning calorimetry is used as the glass transition temperature of the monomer.

The content of the hydroxy-containing acrylic resin particle (X1) having a core-shell structure wherein the shell has an acid value of 90 to 100 mg KOH/g in the aqueous base paint (X) is preferably 2 to 70 mass %, more preferably 5 to 50 mass %, and even more preferably 10 to 40 mass %, based on the resin solids content of the aqueous base paint (X).

The hydroxy-containing acrylic resin particle (X2) having a core-shell structure wherein the shell has an acid value of 110 to 120 mg KOH/g can be produced in the same manner as the method for producing the hydroxy-containing acrylic resin particle (X1) having a core-shell structure wherein the shell has an acid value of 90 to 100 mg KOH/g.

In view of finished appearance of the resulting coating film etc., the hydroxy-containing acrylic resin particle (X2) having a core-shell structure wherein the shell has an acid value of 110 to 120 mg KOH/g, preferably has a hydroxy value of 1 to 50 mg KOH/g, more preferably 2 to 30 mg KOH/g, and even more preferably 3 to 20 mg KOH/g.

In view of water resistance of the resulting coating film etc., the core portion of the hydroxy-containing acrylic resin particle (X2) having a core-shell structure wherein the shell has an acid value of 110 to 120 mg KOH/g, preferably has a hydroxy value of 20 mg KOH/g or less, more preferably 15 mg KOH/g or less, and even more preferably 10 mg KOH/g or less.

In view of water resistance of the resulting coating film etc., the shell of the hydroxy-containing acrylic resin particle (X2) having a core-shell structure wherein the shell has an acid value of 110 to 120 mg KOH/g, preferably has a hydroxy value of 20 to 80 mg KOH/g, more preferably 25 to 70 mg KOH/g, and even more preferably 30 to 60 mg KOH/g.

In view of storage stability of the paint, water resistance of the resulting coating film, etc., the hydroxy-containing acrylic resin particle (X2) having a core-shell structure wherein the shell has an acid value of 110 to 120 mg KOH/g, preferably has an acid value of 5 to 50 mg KOH/g, more preferably 10 to 40 mg KOH/g, and even more preferably 15 to 30 mg KOH/g.

In view of production stability, storage stability of the paint, etc., the core portion of the hydroxy-containing acrylic resin particle (X2) having a core-shell structure wherein the shell has an acid value of 110 to 120 mg KOH/g, preferably has an acid value of 20 mg KOH/g or less, more preferably 15 mg KOH/g or less, and even more preferably 10 mg KOH/g or less.

In view of water resistance of the resulting coating film etc., the hydroxy-containing acrylic resin particle (X2) having a core-shell structure wherein the shell has an acid value of 110 to 120 mg KOH/g, preferably has a glass transition temperature of 10° C. or higher, more preferably 20° C. or higher, and even more preferably within the range of 20 to 50° C.

In view of water resistance of the resulting coating film, coating film formability, etc., the core portion of the hydroxy-containing acrylic resin particle (X2) having a core-shell structure wherein the shell has an acid value of 110 to 120 mg KOH/g, preferably has a glass transition temperature of 10° C. or higher, more preferably 20° C. or higher, and even more preferably within the range of 20 to 50° C.

In view of film formation of the paint etc., the shell portion of the hydroxy-containing acrylic resin particle (X2) having a core-shell structure wherein the shell has an acid value of 110 to 120 mg KOH/g, preferably has a glass transition temperature of 20° C. or higher, more preferably 30° C. or higher, and even more preferably within the range of 30 to 60° C.

The content of the hydroxy-containing acrylic resin particle (X2) having a core-shell structure wherein the shell has an acid value of 110 to 120 mg KOH/g in the aqueous base paint (X) is preferably 2 to 70 mass %, more preferably 5 to 50 mass %, and even more preferably 10 to 40 mass %, based on the resin solids content of the aqueous base paint (X).

The associative thickener (X3) is a thickening agent that has a hydrophilic moiety and a hydrophobic moiety in the molecule and that has the action of effectively improving the viscosity in aqueous media by adsorption of the hydrophobic moiety on the surface of pigment or resin particles in a paint or by association between hydrophobic moieties.

The associative thickener (X3) can be a commercially available product. Examples of commercially available products that can be used include "UH-420," "UH-450," "UH-462," "UH-472," "UH-540," "UH-752," "UH-756VF," and "UH-814N," produced by Adeka Corporation; "PRIMAL RM-8W," "PRIMAL RM-825," "PRIMAL RM-2020NPR," "PRIMAL RM-12W," and "PRIMAL SCT-275," produced by Rohm and Haas; and "SN Thickener 612," "SN Thickener 621N," "SN Thickener 625N," "SN Thickener 627N," and "SN Thickener 660T," produced by San Nopco Ltd.

The content of the associative thickener (X3) in the aqueous base paint (X) is preferably within the range of 0.1 to 5 parts by mass, more preferably within the range of 0.2 to 4 parts by mass, and even more preferably within the range of 0.3 to 3 parts by mass, based on the resin solids content of the aqueous base paint (X) taken as 100 parts by mass.

If necessary, the aqueous base paint (X) may further contain resins other than the hydroxy-containing acrylic resin particle (X1) and the hydroxy-containing acrylic resin particle (X2), curing agents, pigments, organic solvents, curing catalysts, dispersants, anti-settling agents, defoamers, thickeners other than the associative thickener (X3), ultraviolet absorbers, light stabilizers, surface-adjusting agents, and the like.

Examples of resins other than the hydroxy-containing acrylic resin particle (X1) and the hydroxy-containing acrylic resin particle (X2) include acrylic resins other than the hydroxy-containing acrylic resin particle (X1) and the hydroxy-containing acrylic resin particle (X2), polyester resins, and polyurethane resins.

Examples of the curing agent include amino resins, polyisocyanate compounds, and blocked polyisocyanate compounds.

Examples of the pigment include color pigments, extender pigments, and luster pigments. Such pigments can be used alone or in a combination of two or more.

When the aqueous base coating paint (X) contains a pigment such as those described above, the amount of the pigment is preferably within the range of 1 to 50 parts by mass, more preferably within the range of 2 to 40 parts by mass, and even more preferably within the range of 3 to 30 parts by mass, based on the resin solids content of the aqueous base paint (X) taken as 100 parts by mass.

Examples of the color pigments include titanium oxide, zinc oxide, carbon black, molybdenum red, Prussian blue, cobalt blue, azo pigments, phthalocyanine pigments, quinacridone pigments, isoindoline pigments, threne pigments, perylene pigments, dioxazine pigments, and diketopyrrolopyrrole pigments.

When the aqueous base paint (X) contains a color pigment such as those described above, the content of the color pigment is preferably within the range of 0.1 to 30 parts by mass, more preferably 0.5 to 20 parts by mass, and even more preferably 1 to 10 parts by mass, based on the total resin solids content of the aqueous base paint (X) taken as 100 parts by mass.

Examples of the extender pigments include barium sulfate, talc, clay, kaolin, barium carbonate, calcium carbonate, silica, and alumina white.

When the aqueous base paint (X) contains an extender pigment such as those described above, the amount of the extender pigment is preferably within the range of 0.1 to 30 parts by mass, more preferably within the range of 0.5 to 20 parts by mass, and even more preferably within the range of 1 to 10 parts by mass, based on the resin solids content of the aqueous base paint (X) taken as 100 parts by mass.

Examples of the effect pigment include aluminum (including vapor-deposited aluminum), copper, zinc, brass, nickel, glass flakes, aluminum oxide, mica, aluminum oxide coated with titanium oxide and/or iron oxide, and mica coated with titanium oxide and/or iron oxide. Among these, aluminum pigments are preferable for use. Examples of aluminum pigments include non-leafing aluminum pigments and leafing aluminum pigments, either of which can be used.

The effect pigment is preferably in the form of flakes. The effect pigment suitable for use preferably has a longitudinal dimension of 1 to 100 µm, and particularly preferably 5 to 40 µm, and preferably has a thickness of 0.001 to 5 µm, and particularly preferably 0.01 to 2 µm.

When the aqueous base paint (X) contains an effect pigment such as those described above, the amount of the effect pigment is preferably within the range of 0.1 to 30 parts by mass, more preferably within the range of 0.5 to 20 parts by mass, and even more preferably within the range of 1 to 10 parts by mass, based on the resin solids content of the aqueous base paint (X) taken as 100 parts by mass.

Examples of the organic solvent include ketone solvents such as acetone, methyl ethyl ketone, and methyl isobutyl ketone; ester solvents such as ethyl acetate, butyl acetate, methyl benzoate, ethyl ethoxypropionate, ethyl propionate, and methyl propionate; alcohol solvents such as isopropanol, n-butanol, isobutanol, and 2-ethylhexanol; ether solvents such as tetrahydrofuran, dioxane, and dimethoxyethane; glycol ether solvents such as ethylene glycol monomethyl ether, ethylene glycol monoethyl ether, diethylene glycol monomethyl ether, propylene glycol monomethyl ether acetate, and 3-methoxybutyl acetate; aromatic hydrocarbon-based solvents, aliphatic hydrocarbon-based solvents, and the like.

Examples of thickeners other than the associative thickener (X3) include alkali swelling thickeners.

Before use, the aqueous base paint (X) can be diluted to an appropriate viscosity by adding water and/or an organic solvent, etc., if necessary, and then applied. The appropriate viscosity varies depending on the paint composition. For example, it is preferable to appropriately adjust the viscosity using water and/or an organic solvent to achieve a viscosity within the range of 2000 to 5000 mPas as measured at 20° C. and 6 rpm using a Brookfield viscometer.

The method for applying the aqueous base paint (X) can be a usual coating method commonly used in the art. Examples of the coating method include coating methods using a brush or a coater. Among these, a coating method using a coater is preferable. Preferable examples of the coater include an airless spray coater, an air spray coater, and a rotary-atomization electrostatic coater, such as a paint cassette coater. A rotary-atomization electrostatic coater is particularly preferable. An uncured base coating film having a good coating appearance can be obtained by using the coating material and coating method described above.

The base coating film preferably has a cured film thickness of 5 to 15 µm, and particularly preferably 7 to 12 µm.

Step (4)

The step (4) of the present invention is a step of applying an effect pigment dispersion (Y) to the uncured base coating film to form an uncured effect coating film.

Effect Pigment Dispersion (Y)

In the present specification, the "effect pigment dispersion (Y)" is an aqueous paint that contains a flake-aluminum pigment (Y1), a cellulose-based rheology control agent (Y2), a surface-adjusting agent (Y3), and water, and that has a solids content of 2 to 6 mass %. The effect pigment dispersion (Y) is used to impart luster.

Examples of the flake-aluminum pigment (Y1) include aluminum flake pigments and vapor-deposited aluminum flake pigments.

The aluminum flake pigment is generally produced by crushing and grinding aluminum using a grinding aid in a ball mill or attritor mill in the presence of a grinding medium. Grinding aids for use in the step of producing the aluminum flake pigment include higher fatty acids, such as oleic acid, stearic acid, isostearic acid, lauric acid, palmitic acid, and myristic acid, as well as aliphatic amines, aliphatic amides, and aliphatic alcohols. Grinding liquid media for use include aliphatic hydrocarbons, such as a mineral spirit.

The aluminum flake pigment is broadly categorized into leafing aluminum flake pigments and non-leafing aluminum flake pigments according to the type of grinding aid. In the luster pigment dispersion (Y), a non-leafing flake-aluminum pigment is preferably used to obtain a multilayer coating film having excellent luster. The non-leafing flake-aluminum pigments for use may be those whose surface is not particularly treated, those whose surface is coated with a resin, those whose surface is treated with silica, or those whose surface is treated with phosphoric acid, molybdic acid, or a silane coupling agent. The non-leafing flake-aluminum pigment for use may be a non-leafing flake-aluminum pigment subjected to one or several of such surface treatments.

The vapor-deposited aluminum flake pigment is obtained by vapor-depositing an aluminum film on a base material, removing the base material, and then grinding the vapor-deposited aluminum film. Examples of the base material include films.

Examples of commercially available products that can be used as the vapor-deposited aluminum flake pigment include the "METALURE" series (trade name, produced by Eckart), the "Hydroshine WS" series (trade name, produced by Eckart), the "Decomet" series (trade name, produced by Schlenk), and the "Metasheen" series (trade name, produced by BASF).

The content of the flake-aluminum pigment (Y1) is preferably 30 to 80 parts by mass, and more preferably 40 to 70 mass parts, per 100 mass parts of the solids content of the effect pigment dispersion (Y).

Examples of the cellulose-based rheology control agent (Y2) include carboxymethylcellulose, methylcellulose, hydroxyethyl cellulose, hydroxyethyl methylcellulose, hydroxypropyl methylcellulose, cellulose nanofibers, and cellulose nanocrystals. Of these, cellulose nanofibers are preferable for use.

The cellulose nanofibers preferably have a number average fiber diameter of 2 to 500 nm, more preferably 2 to 250 nm, and even more preferably 2 to 150 nm, and preferably have a number average fiber length of 0.1 to 20 µm, more preferably 0.1 to 15 µm, and even more preferably 0.1 to 10 µm.

The number average fiber diameter and number average fiber length are measured and calculated from, for example, an image obtained by subjecting a sample, which is cellulose nanofibers diluted with water, to a dispersion treatment, casting the sample on a grid coated with a carbon film that has been subjected to hydrophilic treatment, and observing the sample with a transmission electron microscope (TEM).

The cellulose nanofibers for use may be those obtained by defibrating a cellulose material and stabilizing it in water. The cellulose material as used here refers to a raw material in various forms that is mainly composed of cellulose. Specific examples include pulp (e.g., grass plant-derived pulp, such as wood pulp, jute, Manila hemp, and kenaf); natural cellulose, such as cellulose produced by microorganisms; regenerated cellulose obtained by dissolving cellulose in a solvent such as a copper ammonia solution or a morpholine derivative, and subjecting the dissolved cellulose to spinning; and fine cellulose obtained by subjecting the cellulose material to mechanical treatment, such as hydrolysis, alkali hydrolysis, enzymatic decomposition, blasting treatment, or vibration ball milling, to depolymerize the cellulose.

Cellulose nanofibers for use can be anionically modified cellulose nanofibers. Examples of anionically modified cellulose nanofibers include carboxylated cellulose nanofibers, carboxymethylated cellulose nanofibers, sulfate group-containing cellulose nanofibers, and phosphate-group-containing cellulose nanofibers. The anionically modified cellulose nanofibers can be obtained, for example, by incorporating functional groups such as carboxyl groups and carboxymethyl groups into a cellulose material by a known method, washing the obtained modified cellulose to prepare a dispersion of the modified cellulose, and defibrating this dispersion. The carboxylated cellulose is also referred to as "oxidized cellulose."

The oxidized cellulose can be obtained, for example, by oxidizing the cellulose material in water using an oxidizing agent in the presence of a compound selected from the group consisting of N-oxyl compounds, bromides, iodides, and mixtures thereof.

Examples of commercial products of cellulose nanofibers include Rheocrysta (registered trademark) produced by DKS Co., Ltd., and Aurovisc (registered trademark) produced by Oji Holdings Corporation.

The content of the cellulose-based rheology control agent (Y2) is preferably 5 to 30 parts by mass, and more preferably 7 to 20 parts by mass, based on 100 parts by mass of the solids content of the effect pigment dispersion (Y).

Examples of the surface-adjusting agent (Y3) include surface-adjusting agents such as silicone-based surface-adjusting agents, acrylic surface-adjusting agents, vinyl-based surface-adjusting agents, fluorine-based surface-adjusting agents, and acetylene-diol-based surface-adjusting agents. Of these, acetylene-diol-based surface-adjusting agents are preferable. Examples of commercial products of surface-adjusting agent (Y3) include the Dynol series, Surfynol series, and Tego series (produced by Evonik Industries AG), the BYK series (produced by BYK-Chemie), the Glanol series and Polyflow series (produced by Kyoeisha Chemical Co., Ltd.), and the Disparlon series (produced by Kusumoto Chemicals, Ltd.).

The content of the surface-adjusting agent (Y3) is preferably 2 to 15 parts by mass, and more preferably from 4 to 10 parts by mass, per 100 parts by mass of the solids content of the effect pigment dispersion (Y).

The effect pigment dispersion (Y) has a solids content of 2 to 6 mass %. When the solids content is 2 to 6 mass %, a multilayer coating film with excellent luster can be obtained.

The effect pigment dispersion (Y) may further appropriately contain a resin, a curing agent, an effect pigment other than the flake-aluminum pigment (Y1), a color pigment, an extender pigment, an organic solvent, a rheology control agent other than the cellulose-based rheology control agent (Y2), an anti-settling agent, a defoaming agent, an ultraviolet absorber, a light stabilizer, and the like, if necessary.

Examples of the resin include acrylic resins, polyester resins, and urethane resins.

Examples of the curing agent include amino resins, polyisocyanate compounds, and blocked polyisocyanate compounds.

Examples of the color pigment include titanium oxide, zinc oxide, carbon black, molybdenum red, Prussian blue, cobalt blue, azo pigments, phthalocyanine pigments, quinacridone pigments, isoindoline pigments, threne pigments, perylene pigments, dioxazine pigments, and diketopyrrolopyrrole pigments.

When the effect pigment dispersion (Y) contains a color pigment such as those mentioned above, the amount of the color pigment used is preferably within the range of 0.1 to 10 parts by mass, more preferably within the range of 0.2 to 5 parts by mass, and even more preferably within the range of 0.3 to 3 parts by mass, per 100 parts by mass of the solids content of the effect pigment dispersion (Y).

Examples of the extender pigment include barium sulfate, talc, clay, kaolin, barium carbonate, calcium carbonate, silica, and alumina white.

When the effect pigment dispersion (Y) contains an extender pigment such as those mentioned above, the amount of the extender pigment used is preferably within the range of 0.1 to 10 parts by mass, more preferably within the range of 0.2 to 5 parts by mass, and even more preferably within the range of 0.3 to 3 parts by mass, per 100 parts by mass of the solids content of the effect pigment dispersion (Y).

Examples of the organic solvent include ketone-based solvents such as acetone, methyl ethyl ketone, and methyl isobutyl ketone; ester-based solvents such as ethyl acetate, butyl acetate, methyl benzoate, ethyl ethoxypropionate, ethyl propionate, and methyl propionate; alcohol-based solvents such as isopropanol, n-butanol, isobutanol, and 2-ethylhexanol; ether-based solvents such as tetrahydrofuran, dioxane, and dimethoxyethane; glycol ether-based solvents such as ethylene glycol monomethyl ether, ethylene glycol monoethyl ether, diethylene glycol monomethyl ether, propylene glycol monomethyl ether acetate, and 3-methoxybutyl acetate; and aromatic hydrocarbon solvents, aliphatic hydrocarbon solvents, and the like.

Examples of the rheology control agents other than the cellulose-based rheology control agent (Y2) include polyacrylic acid-based rheology control agents, mineral-based rheology control agents, and polysaccharide-based rheology control agents.

The method for applying the effect pigment dispersion (Y) may be a usual coating method commonly used in the art. Examples of such a coating method include a coating method using a brush or a coater. Among these, a coating method using a coater is preferred. The coater is preferably an airless spray coater, an air-spray coater, and a rotary-atomization electrostatic coater, such as a paint cassette coater, and is particularly preferably a rotary-atomization electrostatic coater. The use of such a paint and coating method can form an uncured effect coating film with excellent coating appearance.

The effect coating film formed by using the effect pigment dispersion (Y) has a thickness of 0.5 to 1.5 µm on a cured coating film basis. When the effect coating film has a thickness of 0.5 to 1.5 µm on a cured coating film basis, the resulting multilayer coating film has excellent luster.

Step (5)

The step (5) of the present invention is a step of preheating the uncured base coating film and the uncured effect coating film.

The temperature for the preheating treatment is preferably within the range of 60 to 100° C., and more preferably within the range of 70 to 90° C. The preheating time is preferably 1 to 5 minutes.

Step (6)

The step (6) of the present invention is a step of applying a clear paint (Z) to the preheated effect coating film to form an uncured clear coating film.

Clear Paint (Z)

In the present specification, "clear paint (Z)" refers to a transparent paint used to protect the primer coating film, the base coating film, and the effect coating film.

The clear paint (Z) for use in this step is preferably a paint that is commonly used in this field and that contains a base resin, a curing agent, and a medium comprising water or an organic solvent. The base resin and the curing agent here may be known compounds that are commonly used in this field. Examples of the base resin include carboxy-containing acrylic resins, epoxy-containing acrylic resins, and hydroxy-containing acrylic resins. Examples of the curing agent for use include melamine resins, urea resins, polyisocyanate compounds, and blocked polyisocyanate compounds.

Examples of the organic solvent include hydrocarbons, such as aliphatic hydrocarbons (e.g., hexane and heptane), aromatic hydrocarbons (e.g., xylene and toluene), and alicyclic hydrocarbons; esters, such as ethyl acetate and butyl acetate; ethers, such as ethylene glycol monomethyl ether; alcohols, such as ethanol, propanol, and 2-ethylhexyl alcohol; ketones, such as methyl ethyl ketone and methyl isobutyl ketone; amides; and other solvents. Examples of organic solvents containing aromatic hydrocarbons include Swasol 310 and Swasol 1000 (produced by Cosmo Oil Co., Ltd.).

In addition to the above components, the clear paint (Z) for use in the method of the present invention may contain a color pigment, an effect pigment, an extender pigment, an ultraviolet absorber, a defoaming agent, a thickener, a rust inhibitor, a surface-adjusting agent, and the like, if desired.

Coating of the clear paint (Z) having the above structure can form a clear coating film having a sufficient thickness on a dry coating film basis to protect the base coating film and the effect coating film, and having excellent surface smoothness.

The clear paint (Z) can be applied by usual methods commonly used in this field. Examples of the coating method include coating methods using a brush or a coater. Among these, a coating method using a coater is preferable. The coater is preferably, for example, an airless spray coater, an air spray coater, or a rotary-atomization electrostatic coater, such as a paint cassette coater, and is particularly preferably a rotary-atomization electrostatic coater. The use of the above paint and coating method can form an uncured clear coating film with excellent coating appearance.

The clear coating film formed by using the clear paint (Z) has a thickness of preferably 15 to 40 µm, and particularly preferably 20 to 30 µm, on a cured coating film basis, from the standpoint of, for example, obtaining a multilayer coating film with excellent finished appearance and luster.

Step (7)

In step (7) of the present invention, the preheated primer coating film, the base coating film, the effect coating film, and the uncured clear coating film are heated at a temperature of 110 to 130° C. to simultaneously cure these coating films.

The heating may be performed by, for example, hot-air heating, infrared heating, or high-frequency heating. The heating temperature is preferably 110 to 130° C. The heating time is preferably 10 to 60 minutes, and more preferably 15 to 40 minutes.

EXAMPLES

The present invention is described in more detail below with reference to Production Examples, Examples, and Comparative Examples. These Production Examples, Examples, and Comparative Examples are mere examples, and are not intended to restrict the scope of the present invention. In the Production Examples, Examples, and Comparative Examples, parts and percentages are based on mass unless otherwise specified. The thickness of a coating film is based on its cured coating film.

Production of Hydroxy-Containing Acrylic Resin Particle (X1) Having a Core-Shell Structure Wherein the Shell has an Acid Value of 90 to 100 mg KOH/g Production Example 1

128 parts of deionized water and 2 parts of Adeka Reasoap SR-1025 (trade name, produced by Adeka Corporation, an emulsifier, active ingredient: 25%) were placed in a reaction vessel equipped with a thermometer, a thermostat, a stirrer, a reflux condenser, a nitrogen inlet tube, and a dropping funnel. The mixture was stirred and mixed in a nitrogen flow, and heated to 80° C.

Subsequently, 1% of the entire amount of the monomer emulsion for the core portion shown below and 5.3 parts of a 6% ammonium persulfate aqueous solution were introduced into the reaction vessel and maintained therein at 80° C. for 15 minutes. The remaining monomer emulsion for the core portion was then added dropwise over a period of 3 hours to the reaction vessel maintained at the same temperature. After completion of the dropwise addition, the mixture was aged for 1 hour. Subsequently, the shell-portion emulsion shown below was added dropwise to the reaction vessel over a period of 1 hour, followed by aging for 1 hour. The mixture was then cooled to 30° C. while gradually adding 40 parts of a 5% 2-(dimethylamino) ethanol aqueous solution to the reaction vessel, and filtered through a 100-mesh nylon cloth, thereby obtaining a hydroxy-containing acrylic resin particle (X1-1) with an average particle size of 100 nm and with a core-shell structure wherein the shell with a solids content of 30% had an acid value of 90 to 100 mg KOH/g. The obtained hydroxy-containing acrylic resin particle (X1-1) with a core-shell structure wherein the shell had an acid value of 90 to 100 mg KOH/g had an acid value of 96 mg KOH/g in the shell.

Core portion-monomer emulsion: 40 parts of deionized water, 2.8 parts of Adeka Reasoap SR-1025, 2.1 parts of methylene bisacrylamide, 22.9 parts of styrene, 25 parts of methyl methacrylate, 15 parts of ethyl acrylate, and 5 parts of n-butyl acrylate were mixed and stirred to obtain a monomer emulsion for the core portion.

Monomer emulsion for the shell portion: 17 parts of deionized water, 1.2 parts of Adeka Reasoap SR-1025, 0.03 parts of ammonium persulfate, 2.8 parts of styrene, 2.2 parts of 2-hydroxyethyl acrylate, 4.4 parts of methacrylic acid, 6 parts of methyl methacrylate, 1.8 parts of ethyl acrylate, and 12.8 parts of n-butyl acrylate were mixed and stirred to obtain a monomer emulsion for the shell portion.

Production of Hydroxy-Containing Acrylic Resin Particle (X2) Having a Core-Shell Structure with a Shell Acid Value of 110 to 120 mg KOH/g Production Example 2

128 parts of deionized water and 2 parts of Adeka Reasoap SR-1025 (trade name, produced by Adeka Corporation, an emulsifier, active ingredient: 25%) were placed in a reaction vessel equipped with a thermometer, a thermostat, a stirrer, a reflux condenser, a nitrogen inlet tube, and a dropping funnel. The mixture was stirred and mixed in a nitrogen flow, and heated to 80° C.

Subsequently, 1% of the entire amount of the monomer emulsion for the core portion shown below, and 5.3 parts of a 6% ammonium persulfate aqueous solution were introduced into the reaction vessel and maintained therein at 80° C. for 15 minutes. The remaining monomer emulsion for the core portion was then added dropwise over a period of 3 hours to the reaction vessel maintained at the same temperature. After completion of the dropwise addition, the mixture was aged for 1 hour. Subsequently, the monomer emulsion for the shell portion shown below was added dropwise to the reaction vessel over a period of 1 hour, followed by aging for 1 hour. While gradually adding 40 parts of a 5% 2-(dimethylamino) ethanol aqueous solution to the reaction vessel, the mixture was then cooled to 30° C., and filtered through a 100-mesh nylon cloth, thereby obtaining a hydroxy-containing acrylic resin particle (X2-1) with an average particle size of 100 nm and with a core-shell structure wherein the shell with a solids content of 30% had an acid value of 110 to 120 mg KOH/g. The obtained hydroxy-containing acrylic resin particle (X2-1) having a core-shell structure with a shell acid value of 110 to 120 mg KOH/g had an acid value of 115 mg KOH/g in the shell.

Monomer emulsion for the core portion: 40 parts of deionized water, 2.8 parts of "Adeka Reasoap SR-1025," 2.1 parts of methylene bisacrylamide, 22.9 parts of styrene, 15 parts of methyl methacrylate, 15 parts of ethyl acrylate, and 15 parts of n-butyl acrylate were mixed and stirred to obtain a monomer emulsion for the core portion.

Monomer emulsion for the shell portion: 17 parts of deionized water, 1.2 parts of Adeka Reasoap SR-1025, 0.03 parts of ammonium persulfate, 2.8 parts of styrene, 2.2 parts of 2-hydroxyethyl acrylate, 5.3 parts of methacrylic acid, 10 parts of methyl methacrylate, 3.7 parts of ethyl acrylate, and 6 parts of n-butyl acrylate were mixed and stirred to obtain a monomer emulsion for the shell portion.

Preparation of Another Hydroxy-Containing Acrylic Resin Particle (C)

Production Example 3

128 parts of deionized water and 2 parts of Adeka Reasoap SR-1025 (trade name, produced by Adeka Corporation, an emulsifier, active ingredient: 25%) were placed in a reaction vessel equipped with a thermometer, a thermostat, a stirrer, a reflux condenser, a nitrogen inlet tube, and a dropping funnel. The mixture was stirred and mixed in a nitrogen flow, and heated to 80° C.

Subsequently, 1% of the entire amount of the monomer emulsion for the core portion shown below and 5.3 parts of a 6% ammonium persulfate aqueous solution were introduced into the reaction vessel and maintained therein at 80° C. for 15 minutes. The remaining monomer emulsion for the core portion was then added dropwise over a period of 3 hours to the reaction vessel maintained at the same temperature. After completion of the dropwise addition, the mixture was aged for 1 hour. Subsequently, the monomer emulsion for the shell portion shown below was added dropwise to the reaction vessel over a period of 1 hour, followed by aging for 1 hour. The mixture was then cooled to 30° C. while gradually adding 40 parts of a 5% 2-(dimethylamino) ethanol aqueous solution to the reaction vessel, and filtered through a 100-mesh nylon cloth, thereby obtaining a hydroxy-containing acrylic resin particle (C-1) with an average particle size of 100 nm having a core-shell structure with a solids content of 30%. The resulting hydroxy-containing acrylic resin particle (C-1) with a core-shell structure had an acid value of 85 mg KOH/g in the shell.

Monomer emulsion for the core portion: 40 parts of deionized water, 2.8 parts of Adeka Reasoap SR-1025, 2.1 parts of methylene bisacrylamide, 22.9 parts of styrene, 25 parts of methyl methacrylate, 15 parts of ethyl acrylate, and 5 parts of n-butyl acrylate were mixed and stirred to obtain a monomer emulsion for the core portion.

Monomer emulsion for the shell portion: 17 parts of deionized water, 1.2 parts of Adeka Reasoap SR-1025, 0.03 parts of ammonium persulfate, 3.3 parts of styrene, 2.2 parts of 2-hydroxyethyl acrylate, 3.9 parts of methacrylic acid, 6 parts of methyl methacrylate, 1.8 parts of ethyl acrylate, and 12.8 parts of n-butyl acrylate were mixed and stirred to obtain a monomer emulsion for the shell portion.

Production Example 4

128 parts of deionized water and 2 parts of Adeka Reasoap SR-1025 (trade name, produced by Adeka Corporation, an emulsifier, active ingredient: 25%) were placed in a reaction vessel equipped with a thermometer, a thermostat, a stirrer, a reflux condenser, a nitrogen inlet tube, and a dropping funnel. The mixture was stirred and mixed in a nitrogen flow, and heated to 80° C.

Subsequently, 1% of the entire amount of the monomer emulsion for the core portion shown below and 5.3 parts of a 6% ammonium persulfate aqueous solution were introduced into the reaction vessel and maintained therein at 80° C. for 15 minutes. The remaining monomer emulsion for the core portion was then added dropwise over a period of 3 hours to the reaction vessel maintained at the same temperature. After completion of the dropwise addition, the mixture was aged for 1 hour. Subsequently, the monomer emulsion for the shell portion shown below was added dropwise to the reaction vessel over a period of 1 hour, followed by aging for 1 hour. The mixture was then cooled to 30° C. while gradually adding 40 parts of a 5% 2-(dimethylamino) ethanol aqueous solution to the reaction vessel, and filtered through a 100-mesh nylon cloth, thereby obtaining a hydroxy-containing acrylic resin particle (C-2) with a core-shell structure having an average particle size of 100 nm and a solids content of 30%. The resulting hydroxy-containing acrylic resin particle (C-2) had a core-shell structure having an acid value of 106 mg KOH/g in the shell.

Monomer emulsion for the core portion: 40 parts of deionized water, 2.8 parts of Adeka Reasoap SR-1025, 2.1 parts of methylene bisacrylamide, 22.9 parts of styrene, 18 parts of methyl methacrylate, 15 parts of ethyl acrylate, and 12 parts of n-butyl acrylate were mixed and stirred to obtain a monomer emulsion for the core portion.

Monomer emulsion for the shell portion: 17 parts of deionized water, 1.2 parts of Adeka Reasoap SR-1025, 0.03 parts of ammonium persulfate, 3.3 parts of styrene, 2.2 parts of 2-hydroxyethyl acrylate, 4.9 parts of methacrylic acid, 8.8 parts of methyl methacrylate, 1.8 parts of ethyl acrylate, and 9 parts of n-butyl acrylate were mixed and stirred to obtain a monomer emulsion for the shell portion.

Production Example 5

128 parts of deionized water and 2 parts of Adeka Reasoap SR-1025 (trade name, produced by Adeka Corporation, an emulsifier, active ingredient: 25%) were placed in a reaction vessel equipped with a thermometer, a thermostat, a stirrer, a reflux condenser, a nitrogen inlet tube, and a dropping funnel. The mixture was stirred and mixed in a nitrogen flow, and heated to 80° C.

Subsequently, 1% of the entire amount of the monomer emulsion for the core portion shown below and 5.3 parts of a 6% ammonium persulfate aqueous solution were introduced into the reaction vessel and maintained therein at 80° C. for 15 minutes. The remaining monomer emulsion for the core portion was then added dropwise over a period of 3 hours to the reaction vessel maintained at the same temperature. After completion of the dropwise addition, the mixture was aged for 1 hour. Subsequently, the monomer emulsion for the shell portion shown below was added dropwise to the reaction vessel over a period of 1 hour, followed by aging for 1 hour. The mixture was then cooled to 30° C. while gradually adding 40 parts of a 5% 2-(dimethylamino) ethanol aqueous solution to the reaction vessel, and filtered through a 100-mesh nylon cloth, thereby obtaining a hydroxy-containing acrylic resin particle (C-3) with an average particle size of 100 nm having a core-shell structure with a solids content of 30%. The resulting hydroxy-containing acrylic resin particle (C-3) had a core-shell structure wherein the shell had an acid value of 126 mg KOH/g.

Monomer emulsion for the core portion: 40 parts of deionized water, 2.8 parts of Adeka Reasoap SR-1025, 2.1 parts of methylene bisacrylamide, 22.9 parts of styrene, 12 parts of methyl methacrylate, 18 parts of ethyl acrylate, and 12 parts of n-butyl acrylate were mixed and stirred to obtain a monomer emulsion for the core portion.

Monomer emulsion for the shell portion: 17 parts of deionized water, 1.2 parts of Adeka Reasoap SR-1025, 0.03 parts of ammonium persulfate, 2.8 parts of styrene, 2.2 parts of 2-hydroxyethyl acrylate, 5.8 parts of methacrylic acid, 10 parts of methyl methacrylate, 3.2 parts of ethyl acrylate, and 6 parts of n-butyl acrylate were mixed and stirred to obtain a monomer emulsion for the shell portion.

Production of Hydroxy-Containing Acrylic Resin Solution

Production Example 6

35 parts of propylene glycol monopropyl ether was placed into a reaction vessel equipped with a thermometer, a thermostat, a stirrer, a reflux condenser, a nitrogen inlet tube, and a dropping funnel, and heated to 85° C. A mixture comprising 30 parts of methyl methacrylate, 20 parts of 2-ethylhexyl acrylate, 29 parts of n-butyl acrylate, 15 parts of 2-hydroxyethyl acrylate, 6 parts of acrylic acid, 15 parts of propylene glycol monopropyl ether, and 2.3 parts of 2,2'-azobis(2,4-dimethylvaleronitrile) was then added dropwise thereto over a period of 4 hours. After completion of the dropwise addition, the resulting mixture was aged for 1 hour. Further, a mixture of 10 parts of propylene glycol monopropyl ether and 1 part of 2,2'-azobis(2,4-dimethylvaleronitrile) was added dropwise thereto over a period of 1 hour. After completion of the dropwise addition, the resulting mixture was aged for 1 hour. Further, 7.4 parts of diethanolamine was added thereto, thereby obtaining a hydroxy-containing acrylic resin solution (R-1) with a solids content of 55%. The obtained hydroxy-containing acrylic resin solution (R-1) had an acid value of 47 mg KOH/g, a hydroxy value of 72 mg KOH/g, and a weight average molecular weight of 58000.

Preparation of Hydroxy- and Phosphate-Group-Containing Acrylic Resin Solution

Production Example 7

A mixed solvent of 27.5 parts of methoxypropanol and 27.5 parts of isobutanol was placed in a reaction vessel equipped with a thermometer, a thermostat, a stirrer, a reflux condenser, a nitrogen inlet tube, and a dropping device, and heated to 110° C. 121.5 parts of a mixture consisting of 25.0 parts of styrene, 27.5 parts of n-butyl methacrylate, 20.0 parts of "isostearyl acrylate" (trade name, produced by Osaka Organic Chemical Industry Co., Ltd., branched higher alkyl acrylate), 7.5 parts of 4-hydroxybutyl acrylate, 15.0 parts of a phosphate-group-containing polymerizable monomer shown below, 12.5 parts of 2-methacryloyloxyethyl acid phosphate, 10.0 parts of isobutanol, and 4.0 parts of t-butyl peroxy octanoate was added to the mixed solvent over 4 hours. Further, a mixture consisting of 0.5 parts of t-butyl peroxy octanoate and 20.0 parts of isopropanol was added dropwise for 1 hour. The mixture was then stirred and aged for 1 hour to obtain a hydroxy- and phosphate-group-containing acrylic resin solution (R-2) with a solids content of 50%. The resulting hydroxy- and phosphate-group-containing acrylic resin solution (R-2) had an acid value of 83 mg KOH/g, a hydroxy value of 29 mg KOH/g, and a weight average molecular weight of 10000.

Phosphate-group-containing polymerizable monomer: 57.5 parts of monobutyl phosphate and 41.0 parts of isobutanol were placed in a reaction vessel equipped with a thermometer, a thermostat, a stirrer, a reflux condenser, a nitrogen inlet tube, and a dropping device. After the resulting mixture was heated to 90° C., 42.5 parts of glycidyl methacrylate was added dropwise over 2 hours. The resulting mixture was further stirred and aged for 1 hour. 59.0 parts of isopropanol was then added to obtain a phosphate-group-containing polymerizable monomer solution with a solids content of 50%. The resulting monomer has an acid value of 285 mg KOH/g.

Preparation of Hydroxy-Containing Polyester Resin

Production Example 8

109 parts of trimethylolpropane, 141 parts of 1,6-hexanediol, 126 parts of 1,2-cyclohexanedicarboxylic anhydride, and 120 parts of adipic acid were placed into a reactor equipped with a thermometer, a thermostat, a stirrer, a reflux condenser, and a water separator, and heated from 160° C. to 230° C. over a period of 3 hours, and then a condensation reaction was allowed to proceed at 230° C. for 4 hours. Subsequently, 38.3 parts of trimellitic anhydride was added to introduce carboxy groups into the obtained condensation reaction product, and a reaction was allowed to proceed at 170° C. for 30 minutes, after which dilution was performed with 2-ethyl-1-hexanol to obtain a hydroxy-containing polyester resin solution (R-3) with a solids content of 70%. The resulting hydroxy-containing polyester resin solution (R-3) had an acid value of 46 mg KOH/g, a hydroxy value of 150 mg KOH/g, and a number average molecular weight of 1,400.

Preparation of Blocked Polyisocyanate Compound

Production Example 9

360 parts of "Sumidur N-3300" (trade name, produced by Sumika Bayer Urethane Co., Ltd., Sumidur being a registered trademark, polyisocyanate having an isocyanurate structure derived from hexamethylene diisocyanate, solids content: about 100%, isocyanate group content: 21.8%), 60 parts of "Uniox M-550" (trade name, produced by NOF Corporation, Uniox being a registered trademark, polyethylene glycol monomethyl ether, and average molecular weight: about 550), and 0.2 parts of 2,6-di-tert-butyl-4-methylphenol were placed in a reaction vessel equipped with a thermometer, a thermostat, a stirrer, a reflux condenser, a nitrogen inlet tube, a dropper, and a simple trap for removed solvent, and thoroughly mixed. The resulting mixture was heated under a nitrogen stream at 130° C. for 3 hours. Subsequently, 110 parts of ethyl acetate and 252 parts of diisopropyl malonate were added. While stirring under a nitrogen stream, 3 parts of a 28% solution of sodium methoxide in methanol was added thereto and the resulting mixture was stirred at 65° C. for 8 hours. The amount of isocyanate in the obtained resin solution was 0.12 mol/kg. Further, 683 parts of 4-methyl-2-pentanol was added thereto. While the temperature of the system was maintained at 80 to 85° C., the solvent was distilled off under reduced pressure over 3 hours to obtain 1010 parts of a blocked polyisocyanate compound (R-4). The simple trap for the removed solvent contained 95 parts of isopropanol. The solids content concentration of the blocked polyisocyanate compound (R-4) was about 60%.

Preparation of Color Pigment Dispersion

Production Example 10

5.5 parts (resin solids content: 3 parts) of the hydroxy-containing acrylic resin solution (R-1) obtained in Production Example 6, 1 part of Carbon MA-100 (trade name, produced by Mitsubishi Chemical Corporation, a carbon black pigment), and 20 parts of deionized water were mixed. After the mixture was adjusted to a pH of 8.2 with 2-(dimethylamino) ethanol, the mixture was dispersed using a paint shaker for 30 minutes, thereby obtaining a color pigment dispersion (P-1).

Preparation of Extender Pigment Dispersion

Production Example 11

5.5 parts (resin solids content: 3 parts) of the hydroxy-containing acrylic resin solution (R-2) obtained in Production Example 6, 10 parts of Barifine BF-20 (trade name, produced by Sakai Chemical Industry Co., Ltd., a barium sulfate pigment), 0.6 parts (solids content: 0.3 parts) of Surfynol 104A (trade name, produced by Air Products, a defoaming agent, solids content: 50%), and 20 parts of deionized water were mixed. The mixture was dispersed using a paint shaker for 1 hour, thereby obtaining an extender pigment dispersion (P-2).

Preparation of Effect Pigment Dispersion

Production Example 12

In a vessel for stirring and mixing, 8 parts (solids content: 6 parts) of Alpaste TCR2060 (trade name, produced by Toyo Aluminium K.K., an aluminum pigment paste, aluminum content: 75%), 35.0 parts of 2-ethyl-1-hexanol, and 8 parts (solids content 4 parts) of the hydroxy- and phosphate-group-containing acrylic resin solution (R-2) obtained in Production Example 7 were uniformly mixed, thereby obtaining an effect pigment dispersion (P-3).

Preparation of Aqueous Base Paint (X)

Production Example 13

60 parts (solids content: 18 parts) of the hydroxy-containing acrylic resin particle (X1-1) obtained in Production Example 1, which is a resin particle having a core-shell structure wherein the shell had an acid value of 90 to 100 mg KOH/g, 40 parts (solids content: 12 parts) of the hydroxy-containing acrylic resin particle (X2-1) obtained in Production Example 2, which is a resin particle having a core-shell structure wherein the shell had an acid value of 110 to 120 mg KOH/g, 42.9 parts (solids content: 30 parts) of the polyester resin solution (R-4) obtained in Production Example 8, 25 parts (solids content: 15 parts) of the blocked polyisocyanate compound (R-5) obtained in Production Example 9, 26.5 parts of the color pigment dispersion (P-1) obtained in Production Example 10, 36.1 parts of the extender pigment dispersion (P-2) obtained in Production Example 11, 51 parts of the effect pigment dispersion (P-3) obtained in Production Example 12, 21.4 parts (solids content: 15 parts) of melamine resin (weight average molecular weight: 1200, solids content: 70%), and 5.4 parts (solids content: 1.5 parts) of "UH-752" (trade name, produced by Adeka Corporation, associative thickener, solids content: 28%) were uniformly mixed. Further, 2-(dimethylamino) ethanol and deionized water were added to the mixture, thereby obtaining an aqueous base paint (X-1) having a pH of 8.0, a paint solids content of 25%, and a paint viscosity B6 value of 4000 mPas as measured at a temperature of 20° C. The B6 value refers to the viscosity as measured with a Brookfield viscometer after rotation for 1 minute at a rotor rotational speed of 6 rpm. As the Brookfield viscometer, a VDA digital Vismetron viscometer (produced by Shibaura System Co., Ltd.) was used.

Production Examples 14 to 20

Aqueous base paints (X-2) to (X-8) having a pH of 8.0 were obtained in the same manner as in Production Example 13, except that the formulations and viscosities were as shown in Table 1 below. The amounts of the components shown in Table 1 are based on solids content by mass.

TABLE 1

| Production Example | | | 13 | 14 | 15 | 16 | 17 | 18 | 19 | 20 |
|---|---|---|---|---|---|---|---|---|---|---|
| Aqueous base paint (X) | | | X-1 | X-2 | X-3 | X-4 | X-5 | X-6 | X-7 | X-8 |
| Hydroxy-containing acrylic resin particle (X1) having a core-shell structure wherein the shell has an acid value of 90 to 100 mg KOH/g (X1) | Hydroxy-containing acrylic resin particle (X1-1) | | 18 | 12 | 24 | 6 | | 18 | | 18 |

TABLE 1-continued

| Production Example | | 13 | 14 | 15 | 16 | 17 | 18 | 19 | 20 |
|---|---|---|---|---|---|---|---|---|---|
| Hydroxy-containing acrylic resin particle having a core-shell structure wherein the shell has an acid value of 110 to 120 mg KOH/g (X2) | Hydroxy-containing acrylic resin particle (X2-1) | 12 | 18 | 6 | 24 | 18 | | | 12 |
| Another acrylic resin particle (C) | Hydroxy-containing acrylic resin particle (C-1) | | | | | 12 | | | |
| | Hydroxy-containing acrylic resin particle (C-2) | | | | | | | 30 | |
| | Hydroxy-containing acrylic resin particle (C-2) | | | | | | 12 | | |
| Hydroxy-containing polyester resin solution (R-3) | | 30 | 30 | 30 | 30 | 30 | 30 | 30 | 30 |
| Blocked polyisocyanate compound (R-4) | | 15 | 15 | 15 | 15 | 15 | 15 | 15 | 15 |
| Color pigment dispersion (P-1) | Hydroxy-containing acrylic resin solution (R-1) | 3 | 3 | 3 | 3 | 3 | 3 | 3 | 3 |
| | Carbon MA-100 | 1 | 1 | 1 | 1 | 1 | 1 | 1 | 1 |
| Extender pigment dispersion (P-2) | Hydroxy-containing acrylic resin solution(R-1) | 3 | 3 | 3 | 3 | 3 | 3 | 3 | 3 |
| | Barifine BF-20 | 10 | 10 | 10 | 10 | 10 | 10 | 10 | 10 |
| | Surfynol 104A | 0.3 | 0.3 | 0.3 | 0.3 | 0.3 | 0.3 | 0.3 | 0.3 |
| Effect pigment dispersion (P-3) | Alpaste TCR2060 | 6 | 6 | 6 | 6 | 6 | 6 | 6 | 6 |
| | Hydroxy- and phosphate-group-containing acrylic resin solution (R-2) | 4 | 4 | 4 | 4 | 4 | 4 | 4 | 4 |
| Melamine resin | | 15 | 15 | 15 | 15 | 15 | 15 | 15 | 15 |
| Associative thickener (X3) | UH-752 | 1.5 | 1.5 | 1.5 | 1.5 | 1.5 | 1.5 | 1.5 | |
| Other thickener | Primal ASE-60 (*1) | 0.1 | 0.1 | 0.1 | 0.1 | 0.1 | 0.1 | 0.1 | 1.6 |
| Viscosity (mPa·s) | | 4000 | 4100 | 3800 | 4300 | 4100 | 4300 | 4400 | 4800 |

(*1) "Primal ASE-60" (trade name, produced by The Dow Chemical Company, alkaline swelling thickener, solids content: 28%).

Preparation of Effect Pigment Dispersion (Y)

Production Example 21

In a vessel for stirring and mixing, an acetylenediol-based surface-adjusting agent (solids content: 0.3 parts), Alpaste EMR-B6360 (trade name, a non-leafing aluminum flake, produced by Toyo Aluminium K.K., average particle size D50:10.3 μm, average thickness: 0.19 μm, the surface being treated with silica) (solids content: 1.5 parts), a phosphate-group-containing cellulose nanofiber aqueous dispersion (number average fiber diameter: 4 nm, the amount of phosphate groups introduced: 1.50 mmol/g) (solids content: 0.5 parts), a triazine ultraviolet absorber (solids content 0.1 parts), a hindered amine light stabilizer (solids content: 0.1 part), and the color pigment dispersion (P-1) obtained in Production Example 10 (solids content: 0.1 parts) were stirred and mixed. Subsequently, a liquid mixture of water and isopropyl alcohol (water/isopropyl alcohol=6/1) was added, thereby preparing an effect pigment dispersion (Y-1) with a solids content of 4.5%. The paint viscosity B6 value was 1500 mPa·s.

Preparation of Aqueous Primer Paint (W)

Aqueous primer paint (W-1): Ascalex 2870CD-1 Dark Gray (trade name, produced by Kansai Paint Co., Ltd., an acrylic resin-based aqueous conductive primer paint for PP materials) was used as an aqueous primer paint (W-1).

Preparation of Clear Paint (Z)

Clear paint (Z-1): KINO6510 (trade name, produced by Kansai Paint Co., Ltd., a hydroxy/isocyanate-curable, acrylic resin/urethane resin-based two-component organic solvent-based paint) was used as a clear paint (Z-1).

Preparation of Test Substrates

A black polypropylene plastic molded article was degreased to prepare a test substrate.

Preparation of Coated Test Plate

Example 1

The aqueous primer paint (W-1) was applied to the test substrate using a rotary atomizing coater to a cured film thickness of 9 μm to form an uncured primer coating film. The coated substrate was allowed to stand for 3 minutes and then preheated at 60° C. for 3 minutes.

Subsequently, the aqueous base paint (X-1) obtained in Production Example 13 was applied to the preheated primer coating film to a film thickness of 10 μm on a dry coating film basis using a Robot Bell (produced by ABB) at a booth temperature of 22° C. and a humidity of 78%, thereby forming an uncured base coating film. The resulting product was allowed to stand for 3 minutes.

Subsequently, the effect pigment dispersion (Y-1) obtained in Production Example 21 was applied to the uncured base coating film to a film thickness of 0.6 μm on a dry coating film basis using a Robot Bell (produced by ABB) at a booth temperature of 22° C. and a humidity of 78%, thereby forming an effect coating film. The resulting product was allowed to stand for 3 minutes and then preheating at 80° C. for 3 minutes.

Next, the clear paint (Z-1) was applied to the preheated (uncured) effect coating film using the Robot Bell (produced by ABB) at a booth temperature of 23° C. and a humidity of 68% to form a clear coating film with a film thickness of 25 μm on a dry coating film basis. After the application, the resulting product was allowed to stand at room temperature for 7 minutes and then heated at 120° C. for 30 minutes in a hot-air circulation drying oven to simultaneously dry the multilayer coating film, thereby obtaining a test plate.

Example 2 and Comparative Examples 1 to 6

Test plates were obtained in the same manner as in Example 1, except that the paints used were as shown in Table 2.

Coating Film Evaluation

The test plates obtained in the manner described above were evaluated based on the following criteria. Table 2 shows the results.

60-Degree Specular Gloss (60 Degree Gloss)

The $L^*$ value of each test plate was measured at an incident angle of 15° ($L^*15$ value) using a multi-angle spectrophotometer. The higher the value, the better. A score of 178 or above was considered as pass.

Finished Appearance: Sagging

Each test plate was visually observed, and the degree of the occurrence of sagging was evaluated according to the following criteria.

Pass: No sag was observed, and the coating film appearance was excellent.

Fail: Sag was observed, and the coating film appearance was insufficient.

Finished Appearance: Smoothness

Each test plate was visually observed, and the degree of smoothness was evaluated according to the following criteria.

Pass: Excellent smoothness and excellent coating film appearance.

Fail: Poor smoothness and insufficient coating film appearance.

TABLE 2

|  | Example | | Comparative Example | | | | | |
| --- | --- | --- | --- | --- | --- | --- | --- | --- |
|  | 1 | 2 | 1 | 2 | 3 | 4 | 5 | 6 |
| Aqueous primer paint (W) | W-1 | W-1 | W-1 | W-1 | W-1 | W-1 | W-1 | W-1 |
| Aqueous base paint (X) | X-1 | X-2 | X-3 | X-4 | X-5 | X-6 | X-7 | X-8 |
| Effect pigment dispersion (Y) | Y-1 | Y-1 | Y-1 | Y-1 | Y-1 | Y-1 | Y-1 | Y-1 |
| Clear paint (Z) | Z-1 | Z-1 | Z-1 | Z-1 | Z-1 | Z-1 | Z-1 | Z-1 |
| $L^*$ value at an incident angle of 15° ($L^*15$ value) | 181 | 181 | 180 | 181 | 180 | 180 | 181 | 180 |
| Finished appearance (sagging) | Pass | Pass | Fail | Pass | Fail | Pass | Fail | Pass |
| Finished appearance (smoothness) | Pass | Pass | Pass | Fail | Pass | Fail | Fail | Fail |

The invention claimed is:

1. A method for forming a multilayer coating film comprising the following steps in sequence:

step (1): applying an aqueous primer paint (W) to a plastic molded article to form an uncured primer coating film;

step (2): preheating the uncured primer coating film;

step (3): applying an aqueous base paint (X) to the preheated primer coating film to form an uncured base coating film;

step (4): applying an effect pigment dispersion (Y) to the uncured base coating film to form an uncured effect coating film;

step (5): preheating the uncured base coating film and the uncured effect coating film;

step (6): applying a clear paint (Z) to the preheated effect coating film to form an uncured clear coating film; and step (7): heating the preheated primer coating film, the preheated base coating film, the preheated effect coating film, and the uncured clear coating film at a temperature in the range of 110 to 130° C. to simultaneously cure the coating films, wherein the aqueous base paint (X) comprises
- a hydroxy-containing acrylic resin particle (X1) having a core-shell structure wherein the shell has an acid value of 90 to 100 mg KOH/g;
- a hydroxy-containing acrylic resin particle (X2) having a core-shell structure wherein the shell has an acid value of 110 to 120 mg KOH/g; and
- an associative thickener (X3);

the ratio by mass of the hydroxy-containing acrylic resin particle (X1) to the hydroxy-containing acrylic resin particle (X2) contained in the aqueous base paint (X1/X2) is in the range of 70/30 to 30/70;

the effect pigment dispersion (Y) contains
- a flake-aluminum pigment (Y1),
- a cellulose-based rheology control agent (Y2),
- a surface-adjusting agent (Y3), and
- water, and the effect pigment dispersion (Y) has a solids content in the range of 2 to 6 mass; and the effect coating film after curing has a film thickness of 0.5 to 1.5 μm.

* * * * *